Patented Jan. 9, 1923.

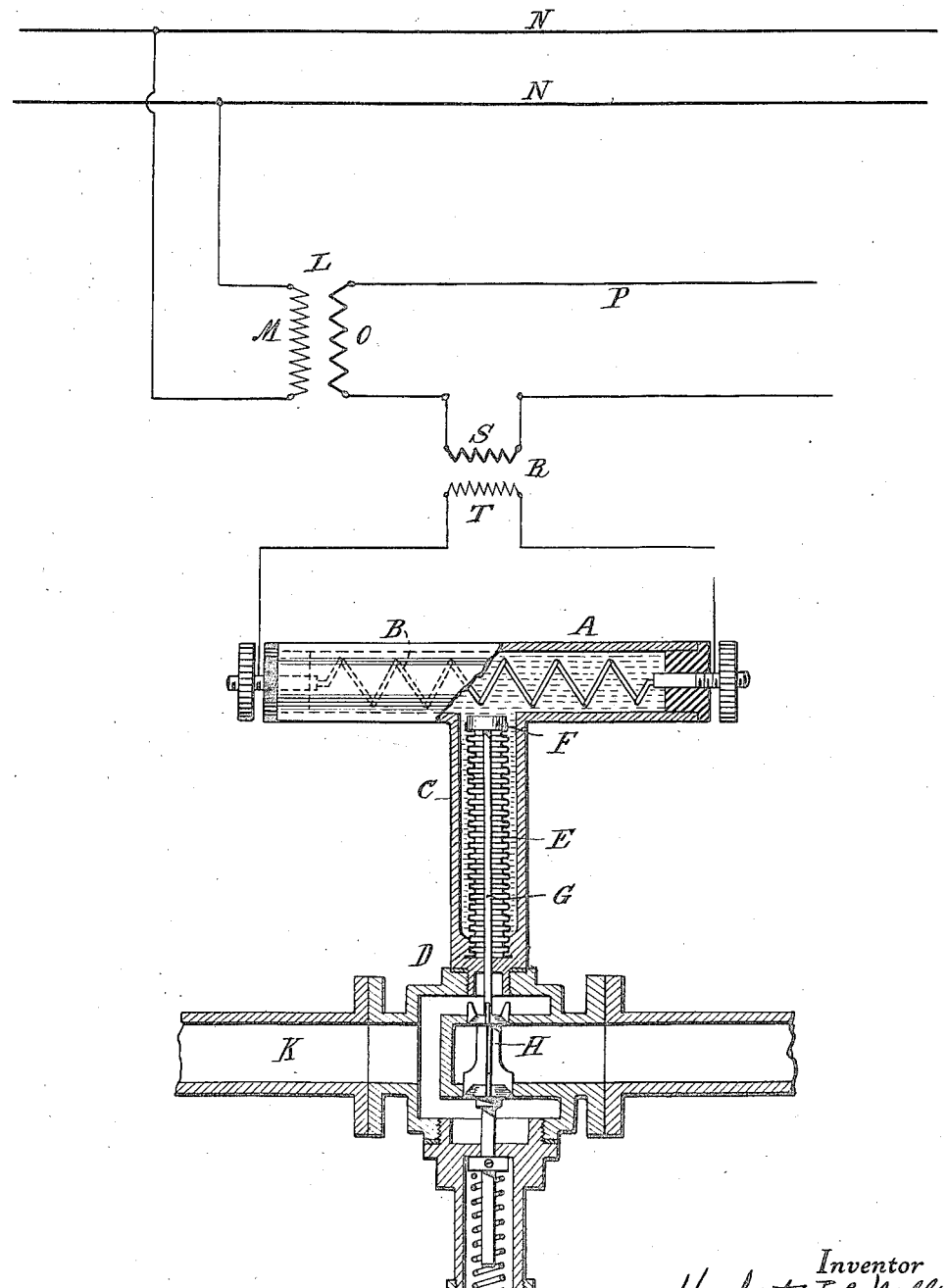

1,441,549

UNITED STATES PATENT OFFICE.

HERBERT J. C. WELLS, OF NEW YORK, N. Y., ASSIGNOR TO MONITOR CONTROLLER COMPANY, OF BALTIMORE, MARYLAND, A CORPORATION.

THERMOSTATIC CONTROLLING DEVICE.

Application filed September 13, 1919. Serial No. 323,652.

*To all whom it may concern:*

Be it known that I, HERBERT J. C. WELLS, a subject of the King of Great Britain, residing at New York, in the county and State of New York, have invented certain new and useful Improvements in Thermostatic Controlling Devices, of which the following is a full, clear, and exact description.

Specifically, the invention which forms the subject of the present application for Letters Patent is embodied in an apparatus in the nature of a thermostatic regulator intended and designed for controlling the rate of flow of the cooling water or other medium in an electrical transformer, and as such it will be shown and described. The improvement, however, involves certain new features which have a wider application as a thermostatic motor device for distance control of valves and the like, which will be understood without special description by those skilled in the art.

The apparatus which I have devised comprises a tube filled with an expansible medium, such as oil, and a wire or conductor of relatively high resistance with provision for connecting it up in a circuit in which the current flow bears a certain fixed relation to that passing in the coils of a transformer with which it is operatively associated. The interior of the tube is in direct communication with a diaphragm tube or chamber (containing oil or other expansible liquid) in which a special form of diaphragm is contained, the said diaphragm consisting preferably of a tube of sheet metal closed at its free end and connected to the end of the containing tube or chamber at the other, and having corrugated walls, whereby any increase in the pressure of the oil or other liquid in its chamber will cause it to contract in length.

To the closed end of this diaphragm is connected a rod which passes through the head of the tube or chamber and is connected to a valve which controls the rate of flow of cooling water through the transformer, so that when any excess of current above a fixed and predetermined limit flows through the transformer, the resistance wire is heated, and causing the oil in its tube to expand, transmits the consequent increase of pressure to the diaphragm chamber and thereby operates to open the valve and permit an increased flow of water or cooling medium through the transformer.

This apparatus is shown in the accompanying drawing in part section, the transformer, the circuits and other parts being diagrammatically indicated.

A is the thermostat chamber preferably for obvious reasons in the form of a tube with closed ends through which terminals for a resistance wire B extend. Connected with this tube and as shown in the drawing at right angles to its middle point is the diaphragm tube C, the free end of which is suitably closed by a head D to which the open end of the cylindrical corrugated diaphragm E is connected. The other end of the diaphragm is closed by a head F to which is connected a rod G that extends through the diaphragm and the head of tube C and is connected with a valve H, preferably spring seated.

Any form of valve suitable for the purpose may be employed, and I have shown one well known in the art. The valve controls the passage through a pipe or conduit K which carries the cooling water to a transformer L in the usual manner, not, however, illustrated in detail herein.

The transformer L is of any usual form and as shown its primary coil M is connected with the feed wires N, N, and its secondary O supplies current to the working circuit P. Connected with the latter is a series transformer R with a primary S and a secondary in circuit with the resistance wire B.

The series transformer preferably may have a ratio of 1000 to one, so that with a normal flow of current under average working conditions of five amperes in the secondary this would be equivalent to 5000 amperes in the primary circuit of the series transformer. Should the load increase, the primary amperage of the series transformer increases, and, of course the secondary increase is in the same ratio. This will result in heating to a proportionate extent the resistance wire expanding the oil and opening the valve to permit more water to flow through the transformer.

Thermostats, both electrical and mechanical, have heretofore been used to control valves to regulate the flow of water, but never, so far as I am aware, under conditions which secured the same advantages, close interrelation between the transformer load and the motor effect on the valve range of movement, resistance and power that result from the arrangement which I have herein shown and set forth.

The cylindrical corrugated diaphragm in the tube or chamber subject to the varying pressure due to variations in the temperature of the resistance wire, is exceptionally sensitive and powerful. For this reason the motor element in itself is a device of wide application and value.

What I claim is:—

1. The combination with a thermostat tube filled with an expansible fluid and a resistance wire therein with terminals for connecting it in a circuit, of a diaphragm tube communicating with the thermostat tube and containing fluid, and a cylindrical corrugated diaphragm therein, one end of which is connected to the end of the tube and the other closed and carrying a regulating rod which passes through the end of the said diaphragm tube.

2. The combination with a tube and a right-angled extension from near the center thereof and containing fluid, of a resistance wire with circuit terminals in the main tube, a cylindrical corrugated diaphragm connected at one end to the end of the extension tube, and having the other end closed and carrying a regulating rod extending through the cylindrical diaphragm and through the end of the extension.

In testimony whereof I hereunto affix my signature.

H. J. C. WELLS.